United States Patent [19]
Jeffery et al.

[11] Patent Number: 6,092,609
[45] Date of Patent: Jul. 25, 2000

[54] FLEXIBLE FOLDING AGRICULTURAL IMPLEMENT

[76] Inventors: Herbert Jeffery, R.R. 1, Box 30; Kelly McNichols, R.R. 1, Box 64, both of Burr Oak, Kans. 66936

[21] Appl. No.: 09/150,110

[22] Filed: Sep. 9, 1998

[51] Int. Cl.⁷ .................................................. A01B 49/00
[52] U.S. Cl. ........................................ 172/311; 172/776
[58] Field of Search ..................................... 172/310, 311, 172/456, 630, 632, 633, 662, 459, 776; 111/57, 62

[56] References Cited

U.S. PATENT DOCUMENTS

| | | | |
|---|---|---|---|
| 1,496,895 | 6/1924 | Kurtz | 172/311 |
| 3,680,172 | 8/1972 | Couser . | |
| 3,797,580 | 3/1974 | Roth | 172/311 |
| 3,841,412 | 10/1974 | Sosalla . | |
| 3,844,358 | 10/1974 | Shuler et al. | 172/311 |
| 3,866,689 | 2/1975 | Anderson | 172/311 |
| 4,044,842 | 8/1977 | Worick . | |
| 4,058,170 | 11/1977 | Ankenman et al. | 172/311 |
| 4,105,077 | 8/1978 | Seifert | 172/311 |
| 4,133,391 | 1/1979 | Richardson et al. | 172/311 |
| 4,204,575 | 5/1980 | Richardson et al. | 172/311 |
| 4,336,846 | 6/1982 | Boetto . | |
| 4,355,689 | 10/1982 | Friggstad | 172/311 |
| 4,415,043 | 11/1983 | Hadler et al. | 172/776 |
| 4,467,875 | 8/1984 | Lewison . | |
| 4,479,554 | 10/1984 | Kueker | 172/311 |
| 4,509,602 | 4/1985 | Russ | 172/311 |
| 4,529,040 | 7/1985 | Grollimund . | |
| 4,619,330 | 10/1986 | Machnee | 172/311 |
| 4,658,911 | 4/1987 | Drever et al. . | |
| 4,721,167 | 1/1988 | Salley . | |
| 4,790,389 | 12/1988 | Adee et al. . | |
| 4,867,245 | 9/1989 | Stevens . | |
| 4,878,545 | 11/1989 | Dyken . | |
| 4,977,964 | 12/1990 | Friggstad et al. . | |
| 5,109,655 | 5/1992 | Tekulve . | |

*Primary Examiner*—Thomas B. Will
*Assistant Examiner*—Nathan Mammen
*Attorney, Agent, or Firm*—Shughart, Thomson & Kilroy, P.C.

[57] ABSTRACT

A flexible folding agricultural implement includes a frame with a number of independent frame sections each supporting a plurality of ground working tools via front and rear ground engaging and depth adjustment wheels. Each frame section is attached to the adjacent section(s) via front flexible link connectors and rear ball joints. Each front flexible link connector is a bar pivotably attached at one end to the center point of one frame section, and, at the other end, to a front corner of an adjacent frame section in alignment with the respective rear ball joint and a scissor limit stop is positioned around each bar which scissor limit stops limit the amount of relative twist between adjacent frame sections to prevent roll over and to allow the link connectors to be made rigid such that they can act as pivot supports for the respective frame sections as they are folded for transport.

21 Claims, 6 Drawing Sheets

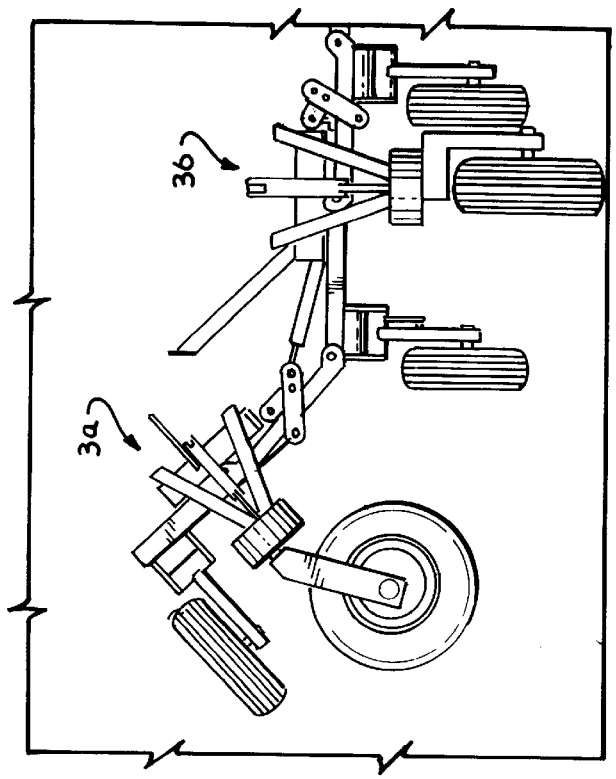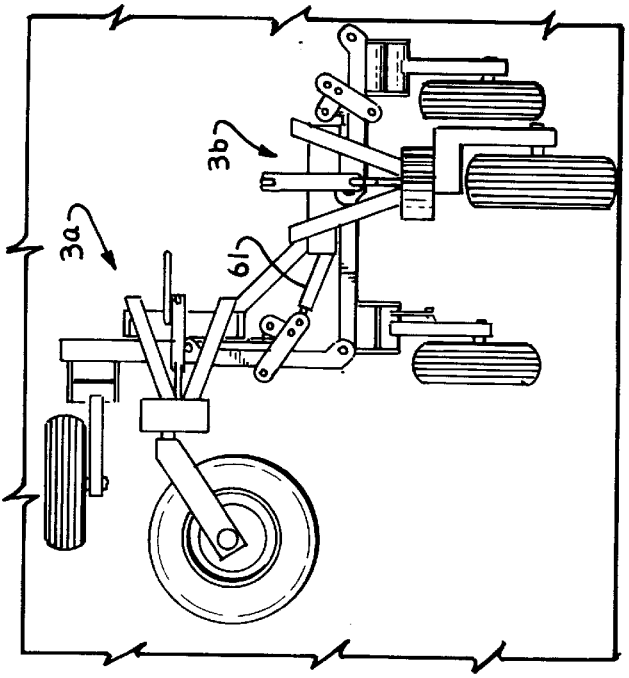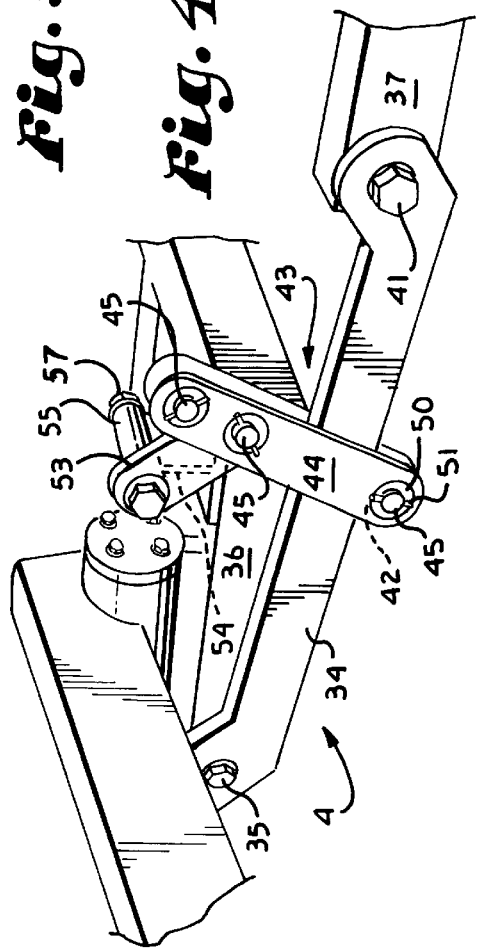

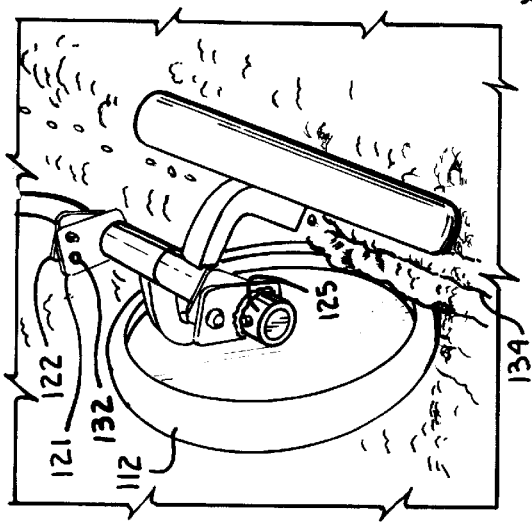
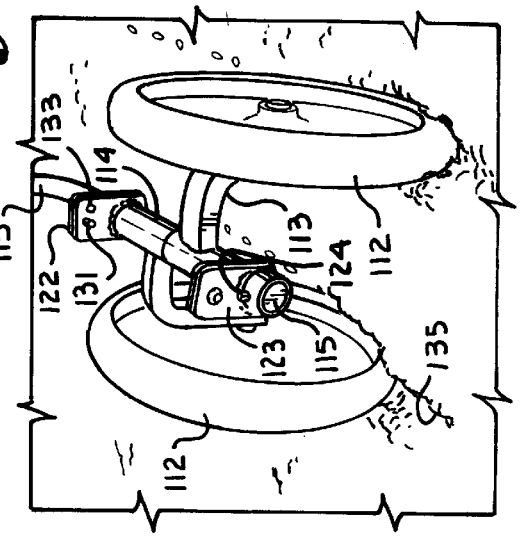
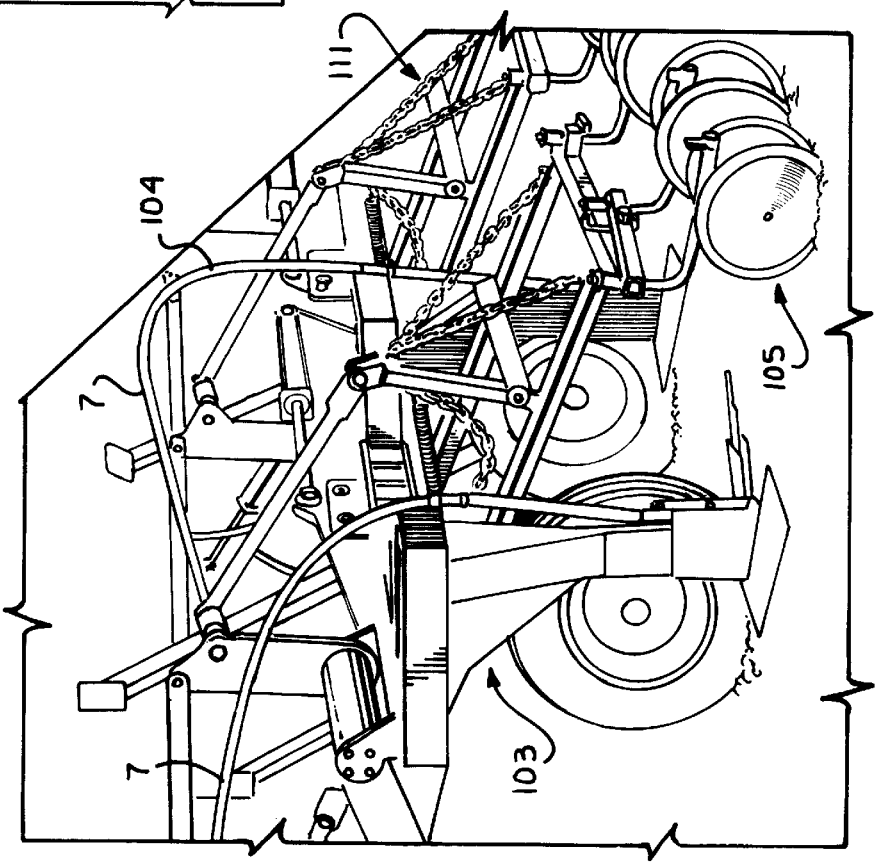

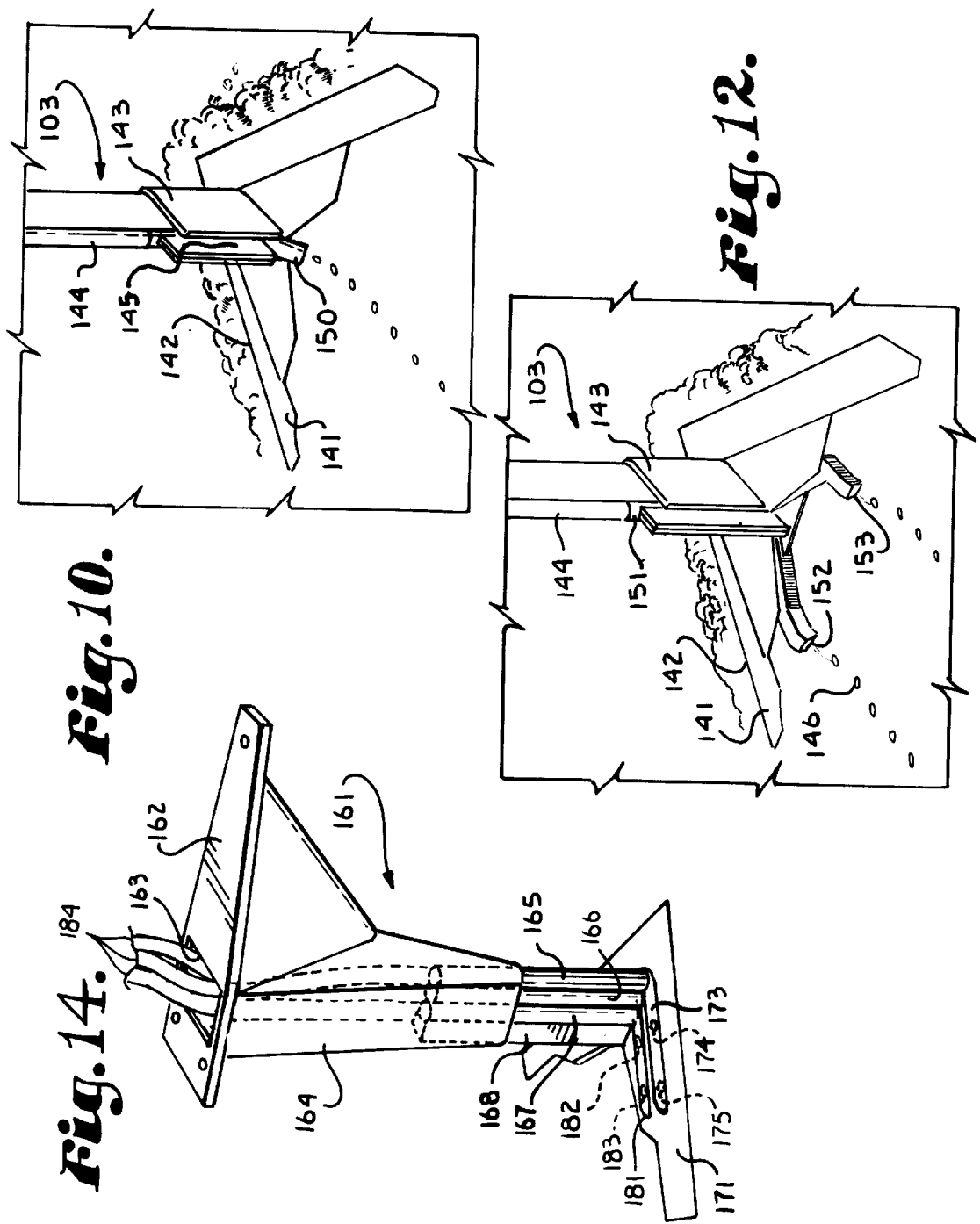

FLEXIBLE FOLDING AGRICULTURAL IMPLEMENT

BACKGROUND OF THE INVENTION

1. Field of the Invention

This invention is directed to a flexible, folding agricultural implement, such as a cultivator-planter, and, more particularly, to such an implement which includes a number of individual frame sections linked to each other via flexible connector links, each of which includes a limit stop which limits the amount of relative twist between adjacent frame sections. The limit stops help to prevent implement roll-over in extreme terrain conditions and also allow the flexible connector links to double as pivot arms as the outer frame sections are folded to narrow the implement for transport.

2. Description of the Related Art

With increasing demand for world-wide food production, agricultural operations have expanded from traditional level terrain to encompass more and more difficult and marginal terrain. Terracing has become more common, even on large scale wheat and soybean farming operations. Combined with this trend is the use of larger and larger tractors, allowing ever wider towed implements to be developed to reduce the time and labor needed for crop planting and cultivating.

However, traditional towed implements, such as cultivators, seeders and discs, have generally used rigid steel frames supported by wheels which are selectively movable up and down relative to the frame to set operating depths for the ground working tools on the implement. The entire frame is thus set at a given, uniform spacing above the wheels. This system works generally satisfactory as long as the terrain is reasonably level or when the implement frame is fairly narrow. However, as the terrain becomes rougher, with man-made terraces and natural undulations, and as implements become wider, the traditional system of having a rigid frame extending the width of the implement with a uniform spacing between frame and wheels is no longer effective. This is because, with the wide rigid frame and undulating terrain, some wheels may actually leave ground contact, lifting their associated working implements such as discs, tines and seed drills, etc. to too shallow a depth for effective ground working. In extreme terrain, some implements may be even lifted entirely out of the ground. This can cause uneven and intermittent cultivation of the soil and or planting of the crop.

A number of attempts have been made to construct a flexible agricultural implement which more closely follows undulations in terrain. One such attempt is reflected in U.S. Pat. No. 3,841,312 to Sosalla. The Sosalla patent teaches a cultivator with multiple wing sections which are hinged connected together along generally horizontal axes. This arrangement allows the wings to pivot in two dimensions relative to each other about the hinges to follow the ground contour. The Sosalla implement is folded by rotating each wing about a horizontal axis and pivoting the outer wings backward to ride on dedicated wheels.

Another attempt to make a flexible implement is found in U.S. Pat. No. 4,790,389 to Raymond Adee and assigned to Flex-King Corporation. In the Adee patent, a field cultivator frame is made of multiple frame sections, with four such sections illustrated. The two center most frame sections are interconnected via a flex link which allows each half of the implement frame to twist up or down somewhat relative to the other half. The two outermost frame sections are attached to the adjacent center section via a hinge which allows them to pivot relative to that center section but not to twist up or down. The two outermost frame sections can be folded 90 degrees relative to respective center sections via a pair of folding piston & cylinder units which pivot the outermost frame sections upward about the hinge connection. Thus, due to the requirement for folding outer frame sections, in the Adee patent only the connection between center frame sections is allowed to twist.

Prior art flexible implements thus suffer from a number of shortcomings. No implement has been devised which allows multiple frame sections to twist up and down relative to each adjacent section while also allowing the sections to be folded for transport. This is because, up to now, no flexible connection system has been devised which allows the flexibility required of a twisting system yet provides a stable pivot arm and axis such that the frame sections can be folded. This presents a significant limitation on the width of the implement and/or the flexibility of the implement since the greater the number of independent sections, the more closely the implement can follow the ground contour. Another problem is that the conventional direct and rigid connection of the implement hitch to the front of the implement frame does not allow forward and rearward tilting of the hitch relative to the frame.

It is clear then, that a need exists for a flexible agricultural implement which can follow the contour of relatively uneven terrain, while maintaining substantially even depth of individual tillage implements across the width and fore and aft length of the implement. Such an implement should be constructed of up to seven sections which are flexibly attached to one another, yet which can be folded to a width substantially equal to three of the sections.

SUMMARY OF THE INVENTION

In the practice of the present invention, a flexible folding agricultural implement includes a frame with a number of independent frame sections interconnected at the front by respective flexible connecting links and at the rear by respective ball joints. Each rear ball joint is formed with a gooseneck type ball and socket joint which acts as a universal joint. A preferred embodiment of the implement includes seven such frame sections, but five, nine or eleven frame sections could be used as well. Attached to each of the sections are a plurality of ground working tools, such as discs, cultivating tines, sweeps, seed drills, etc., and front and rear ground engaging wheels. Each of the front wheels is free castering and all of the wheels on each frame section are attached to rock shaft synchronized torque tubes. Three of the frame sections are center frame sections and the remaining frame sections are all foldable relative to the center frame sections. Each frame section has a dedicated depth setting adjustment operated by a hydraulic piston & cylinder unit attached to the rock shaft such that the wheels on each frame section can be independently adjusted for precise depth control of the ground working tools carried thereby. The front flexible connecting links between adjacent frame sections allow each frame sections to twist (i.e. allows the front ends to float) up or down relative to the adjacent section(s). Each front flexible link connector is a bar pivotably attached at one end to the center point of a front frame member of one frame section, and, at a second end, is pivotably attached to a front corner of the front frame member of an adjacent frame section such that the second bar end pivot attachment is in alignment with the corresponding rear ball joint. A scissor limit stop is positioned around each bar which scissor limit stops have two purposes. First, each limit stop limits the amount of relative movement or twist between adjacent sections. This prevents the possibility of implement roll-over which could occur in extreme conditions. In a preferred embodiment, a maximum six inches up or down of relative movement was chosen as a limit between frame sections. Thus, with seven frame sections, overall flexing from side to side of the frame can accommodate up to 3 feet of deviation from terrain high to low point across the implement. Second, each limit stop limits the flexure between the attached adjacent frame sections and shifts the pivot point to alignment with the corresponding rear ball joint connection between those frame sections as the outer frame sections are folded. This arrangement allows the outer frame sections to be both flexible relative to the adjacent frame sections during field operations and to be foldable for transport purposes. Four folding piston & cylinder units are positioned, respectively, along rear frame members between each folding frame section and the immediately adjacent frame section. An adjustable catch is positioned between each middle folding frame section and the adjacent center frame section which allows the middle folding frame section to be unfolded in a controlled manner. Other features of the implement, when used as a seeder, include the provision of adjustable press wheels and lower seed tubes with interchangeable seed tube extensions, the combination of which allow the implement to be quickly and conveniently shifted between row spacings, e.g. from 10 inch spacing to 20 inch spacing. A unique shank for seeding sweeps includes a number of vertical sleeves for the simultaneous application of anhydrous and/or liquid fertilizer along with the seed. A "V" shaped hitch bar extends from a hitch attachable to a prime mover, such as a tractor, to a pair of spaced pivot points positioned between the front and rear of the implement frame to allow forward and rearward tilting of the hitch relative to the frame.

OBJECTS AND ADVANTAGES OF THE INVENTION

The principal objects and advantages of the present invention include: to provide an improved flexible and foldable agricultural implement; to provide such an implement which includes a frame with a plurality of frame sections; to provide such an implement in which the frame sections are attached to each other along the front of the frame via flexible link connectors such that each frame section can twist up or down relative to the adjacent frame section to allow the implement to follow uneven terrain; to provide such an implement in which each flexible link connector includes a scissors limit stop to limit the degree of twist of each frame section relative to the adjacent frame section(s); to provide such an implement in which the scissor limit stops allow the flexible link connectors to also act as pivot arms such that the outermost frame section or sections can be folded 90 degrees upward to narrow the implement for transport; to provide such an implement in which each frame section is connected to the adjacent section(s) along the rear of the frame with ball joints; to provide such an implement in which a hitch frame is pivotably attached to the center frame section at a point between the front and back of the frame to allow forward and rearward tilting of the hitch about the implement frame; to provide such an implement in which lower seed tubes and associated press wheels can be easily configured for different row spacings; to provide such an implement in which a special shank is provided for a seeding sweep with a number of vertically oriented fertilizer tubes provided therein to allow anhydrous or liquid fertilizer to be applied along with seeds in the furrow created by the seeding sweep; and to provide such an implement which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a greatly enlarged, fragmentary perspective view of one of a plurality of flexible link connectors and attached scissor limit stops arranged between adjacent frame sections.

FIG. 5 is a fragmentary front elevational view of an outermost frame section being folded upward and with the scissor limit stop positioned at the limit.

FIG. 6 is a fragmentary front elevational view of the outermost frame section of FIG. 5, folded to a 90 degree position, showing the return of the scissor limit stop to a normal position.

FIG. 7 is a greatly enlarged, fragmentary rear elevational view of a portion of the implement of FIG. 1, illustrating an adjustable latch plate positioned on one of the center frame sections and a mating latch hook positioned on one of the middle folding frame sections, and with the middle folding frame section being folded upward.

FIG. 8 is a greatly enlarged, fragmentary rear elevational view of a portion of the implement of FIG. 1, illustrating the adjustable latch plate engaged with the mating latch hook as the middle folding frame section is folded to a 90 degree position.

FIG. 9 is an enlarged, fragmentary, rear perspective view of a portion of the implement of FIG. 1, showing the implement configured as a planter, with a plurality of seeding sweeps attached to the frame section configured to drop seeds in a single row and with adjustable trailing press wheel pairs configured to cover the single rows.

FIG. 10 is a greatly enlarged, fragmentary view showing a seeding sweep configured with a single outlet seed tube extension arranged to drop a single row of seeds.

FIG. 11 is a greatly enlarged, fragmentary view showing the adjustable press wheel pair configured to match the seeding sweep configuration of FIG. 10 to cover the single row of seeds.

FIG. 12 is a greatly enlarged, fragmentary view showing the seeding sweep configured with a double outlet seed tube extension arranged to drop two rows of seeds.

FIG. 13 is a greatly enlarged, fragmentary view showing the adjustable press wheel pair configured to match the seeding sweep configuration of FIG. 12 to cover the double row of seeds.

FIG. 14 is a perspective view of an alternative seeding sweep shank provided with a hollow central portion connecting with a plurality of vertically oriented tubes arranged to dispense anhydrous and/or the banding of liquid fertilizer along side of the seeds.

DETAILED DESCRIPTION OF THE INVENTION

I. Introduction and Environment

Figure 1:
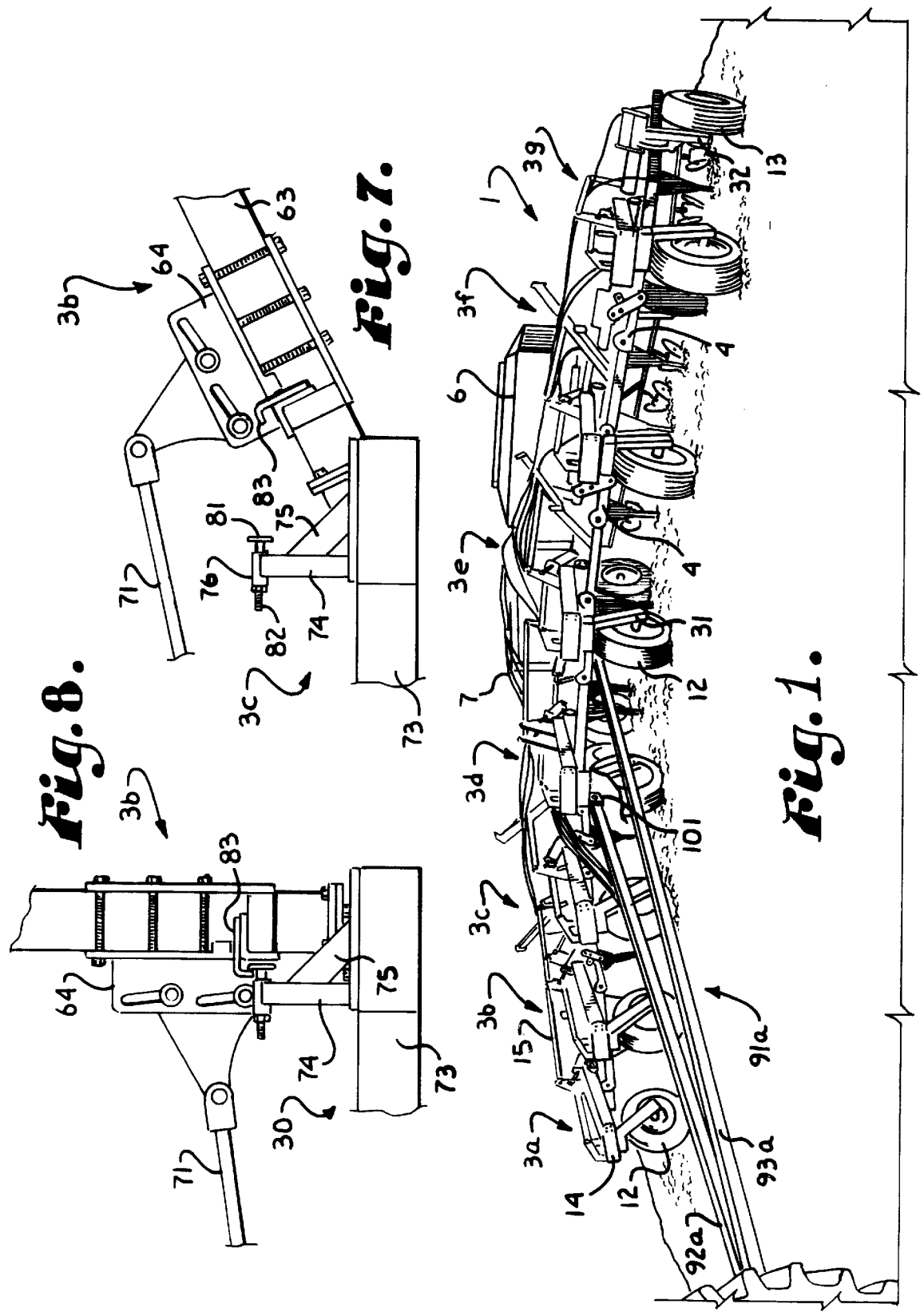
FIG. 1 is a perspective view of a flexible, folding agricultural implement in accordance with the present invention, showing the implement set up as a seeder with a towed pneumatic air seeder cart, with the implement flexing as it is being towed over a terrace.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "up," "down," "right" and "left" will refer to directions in the drawings to which reference is made. The words "inward" and "outward" will refer to directions toward and away from, respectively, the geometric center of the embodiment being described and designated parts thereof. Said terminology will include the words specifically mentioned, derivatives thereof and words of a similar import.

II. Agricultural Implement

Figure 2:
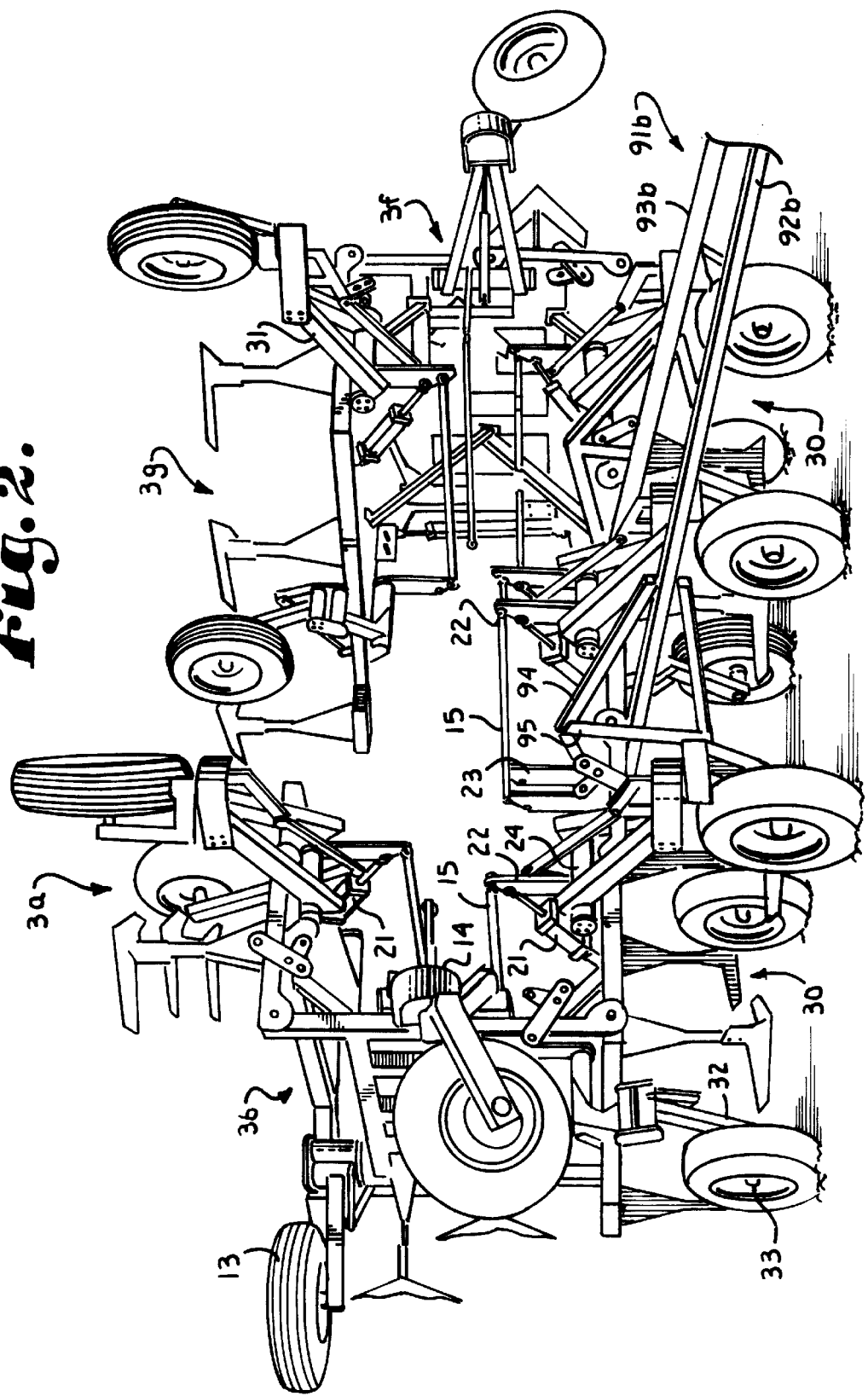
FIG. 2 is a front, perspective view of the implement of FIG. 1 folded for transport.
Figure 3:
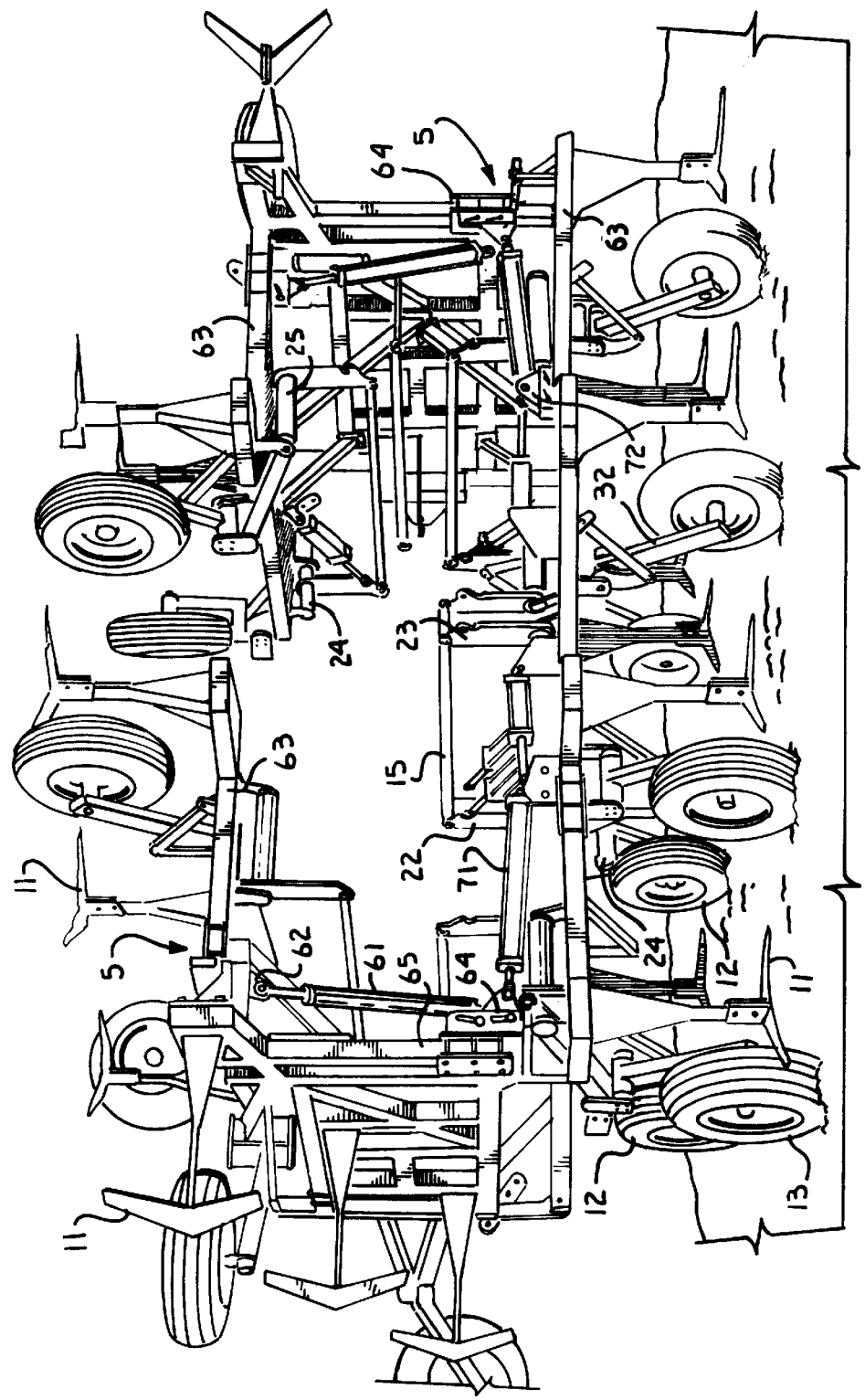
FIG. 3 is a rear, perspective view of the implement of FIG. 1 folded for transport.

Referring to FIGS. 1–3, a flexible folding agricultural implement is illustrated and generally indicated at 1. The implement 1 includes a frame with a number of independent frame sections 3a–3g. Each of the frame sections 3a–3g is attached to the adjacent frame section or sections at the front by respective flexible link connectors 4 and at the rear by respective ball joints 5. While seven frame sections 3a–3g are illustrated and described herein, five, nine or eleven, or any other number of frame sections could be used instead. The implement 1 (FIG. 1) is shown attached to a towed seed cart 6 which supplies metered seed quantities to seeders on the implement 1 via respective pneumatic seed tubes 7.

Attached to each of the frame sections 3a–3g are a plurality of ground working tools, illustrated herein as seeding sweeps 11, and front and rear ground engaging wheels 12 and 13, respectively. Each of the front wheels 12 is attached to the respective frame section 3a–3g via a castering joint 14 such that the front wheels are free castering. Each frame section 3a–3g includes a respective synchronizing link 15 which is attached to a respective depth setting piston & cylinder unit 21. A front end of each synchronizing link 15 is attached to a respective front rockshaft arm 22 and a rear end of each link 15 is attached to a respective rear rockshaft arm 23. The front and rear rockshaft arms 22 and 23, respectively, are rigidly attached to respective front and rear rockshafts 24 and 25 which are, in turn, attached to respective front and rear intermediate links 31 and 32. The front intermediate links 31 are attached to respective ones of the castering joints 14 and the rear intermediate links 32 are attached to respective rear axles 33. As the rephasing depth setting piston & cylinder units 21 are extended and retracted, the synchronizing links 15 pivot their attached front and rear wheels 12 and 13 relative to the corresponding frame section 3a–3g to adjust the working depth of each attached implement, such as the seeding sweeps 11. The working depths of the sweeps 11 on each frame section are thus independently adjusted relative to the wheels 12 and 13 supporting that section. The depth setting piston & cylinder units 21 are preferably synchronized such that the working depths of all ground working tools 11 on the implement 1 are set simultaneously. Each ground working tool 11 is positioned near a respective wheel 12 or 13 for good depth control.

The frame sections 3c, 3d and 3e are center frame sections and the remaining frame sections 3a, 3b, 3f, and 3g are all foldable relative to the center frame sections 3c or 3e, as will be explained below. The connection of each frame section 3a–3g to the adjacent frame section or sections by the respective front flexible link connectors 4 allows each frame section to "twist" up or down relative to the adjacent section(s). Each of the front flexible link connectors 4 (best illustrated in FIG. 4) includes a flexible link connector bar 34 pivotably attached at one end via a first pivot connection 35 to the center point of a front member 36 of one of the frame section 3a–3g and pivotably attached at a second end to a front corner of a front member 37 of an adjacent one of the frame sections 3a–3g via a second pivot connection 41. Each second pivot connection 41 is positioned in front to rear alignment with the respective rear ball joint 5 connecting the rear of the same two frame sections. Each flexible link connector bar 34 includes a depending ear 42 extending beneath the bar 34. A scissor limit stop, generally indicated at 43, is positioned around each bar 34. Each scissor limit stop 43 includes a pair of elongate plates 44 positioned on opposing sides of the bar 34 and attached, proximate a lower end of each plate 44 to the depending ear 42 via a pin 45 held in place via washers 50 and retaining pins 51. The pair of plates 44 is linked together via another pin 45 positioned proximate a top end thereof and also held in place by washers 50 and retaining pins 51. Finally, each pair of plates 44 is also pivotably attached to one end of a pivot arm 53 via a third pin 45 and held in place via washers 50 and retaining pins 51. An opposite end of the pivot arm 53 is pivotably attached to an upright frame support 54 and rigidly attached sleeve 55 via a bolt 57 extending through the sleeve 55.

In operation, the scissor limit stop 43 acts to limit the amount of relative movement between adjacent frame sections in the following manner. Referring again to FIG. 4, as the right frame section moves or twists upward relative to the left frame section, the flexible link connector bar 34 pivots counter clockwise about the left frame section via the first pivot connection 35. This brings the pivot arm 53 into contact with the flexible link connector bar 34, thus stopping the relative movement between the left and right frame sections. Conversely, as the right frame section moves or twists downward relative to the left frame section, the flexible link connector bar 34 pivots clockwise about the left frame section via the first pivot connection 35. This brings the pivot arm 53 into contact with the upper pin 45, again stopping the relative movement between the left and right frame sections. In the preferred embodiment, the up or down relative movement between each pair of adjacent frame sections was limited by the scissor limit stop 43 to 6 inches in either direction. This prevents the possibility of roll-over of the implement 1, which, without the limit stops 43 could occur in extreme conditions. Thus, with seven frame sections 3a–3g, overall flexing from side to side of the frame can accommodate up to 3 feet of deviation from terrain high to low point across the implement.

The other function of the scissor limit stops 43 is best illustrated in FIGS. 5 and 6, which illustrate the leftmost frame section 3a being folded upward relative to the adjacent frame section 3b. An outer folding piston & cylinder unit 61 is pivotably attached at one end to a lift ear 62 (FIG. 3), which, in turn, is rigidly attached to a rear frame member 63 of the frame section 3b. An opposite end of the folding piston & cylinder unit 61 is pivotably attached to a folding bracket 64 which, in turn, is attached to a rear frame member 65 of the adjacent frame section 3a. (It should be noted that the operation of the leftmost frame sections 3a and 3b is the mirror image of the rightmost frame sections 3f and 3g, respectively, but equivalent portions in each half are given the same reference numerals herein).

III. Folding Operation

In order to fold the section 3a, the folding piston & cylinder unit 61 is retracted, which causes the frame section 3a to start to pivot upward about the rear ball joint 5 between the frame sections 3a and 3b. After a momentary delay due to placement of the folding piston & cylinder unit 61 along the rear of the frame sections 3a and 3b, the front portion of the frame section 3a begins to be lifted upward. This lifting movement causes the right side of the front member 36 of the frame section 3a to drop as the entire frame section 3a starts to pivot relative to the connecting flexible link connector bar 34 via the first pivot connection 35. This causes the scissor limit stop 43 to stop the pivoting action of the frame section 3a as the pivot arm 53 comes into parallel contact with the flexible link connector bar 34, as shown in FIG. 5. This has the effect of shifting the front pivot point of the frame section 3a from the first pivot connection 35 to the second pivot connection 41 as the stop limited flexible link connector 4 becomes a rigid pivot arm and the entire left frame section 3a folds upward about a horizontal pivot axis provided by the second pivot connection 41 and the aligned rear ball joint 5.

In order to complete the folding of the implement 1 to the transport position shown in FIGS. 2 and 3, two mirror image middle folding piston & cylinder units 71, are pivotably attached at one end to a respective lift ear 72 (FIG. 3), which, in turn, is rigidly attached to a respective rear frame member 73 of the frame sections 3c and 3e, respectively. An opposite end of each of the folding piston & cylinder units 71 is pivotably attached to the folding bracket 64 which, in turn, is attached to the rear frame member 63 of the frame sections 3b and 3f, respectively, as explained earlier. The middle folding piston & cylinder units 71 are retracted to fold the respective frame sections 3b and 3f inward. The folding piston & cylinder units 61 and 71 are operated, due to pressure/weight limits of the piston & cylinder units, such that the outermost folding piston & cylinder units 61 are fully retracted prior to beginning the retraction of the adjacent folding piston & cylinder units 71. Once the leftmost and rightmost frame sections 3a and 3g, respectively, are folded to the position of FIG. 6, i.e. once the folding piston & cylinder units 61 are fully retracted, the adjacent folding piston & cylinder units 71 are then retracted, thus folding the attached frame sections 3b and 3f upward to a 90 degree position relative to the respective adjacent center frame sections 3c and 3e. Operation of the respective flexible connecting links 4 and scissor limit stops 43 attaching the fronts of frame sections 3b and 3c and 3f and 3e is the same as described earlier with respect to the folding of the outermost sections 3a and 3g. Upon full retraction of the folding piston & cylinder units 71, with the folding piston & cylinder units 61 already fully retracted, the implement 1 is fully folded to the transport configuration of FIGS. 2 and 3. In this configuration, the frame sections 3a and 3g are positioned at a 90 degree angle relative to the frame sections 3b and 3f, respectively and the frame sections 3b and 3f are positioned at a 90 degree angle relative to the center frame sections 3c, 3d, and 3e. Sections 3a and 3g are thus positioned parallel to and upside down relative to the center sections 3c, 3d and 3e.

Referring to FIGS. 7 and 8, another feature of the implement 1 is illustrated. FIGS. 7 and 8 represent enlarged views of the rear junction between frame sections 3b and 3c, both as section 3b is being folded—in FIG. 7, and after section 3b has been folded to the 90 degree position—in FIG. 8. Again, it should be noted that the connection between frame sections 3f and 3e is a mirror image of that illustrated in FIGS. 7 and 8. An upright post 74 is attached to the rear member 73 of the frame section 3c, with the post 74 being supported by an angled brace 75. A threaded sleeve 76 is rigidly attached to the top of the post 74 and a circular latch plate 81 is attached to and forms the head of a threaded bolt 82. The latch plate 81 is thus adjustable in position relative to the sleeve 76. An L shaped latch hook 83 is attached near the folding bracket 64 attached to the rear frame member 63 of the frame section 3b. As the middle folding piston & cylinder units 71 are retracted to fold the frame sections 3b and 3f, as described earlier, the rear of the frame sections 3b and 3f, as represented by the frame member 63 in FIG. 7, start to fold first, with the front of those frame sections following as the respective scissor limit stops become effective. This causes the frame sections 3b and 3f to be folded in a somewhat askew position with their front portions canting slightly forward and outward relative to the rear portions. This allows the latch hooks 83 to be pulled past the respective latch plates 81 in a direction above the latch plates 81 during folding operations. Then, as the middle folding piston & cylinder units 71 are fully retracted, the front and rear portions of the frame sections 3b and 3f come into alignment and the latch hooks 83 are pushed downward to the position shown in FIG. 8 where they engage the respective latch plates 81. As the process is reversed, i.e. as the middle folding piston & cylinder units 71 are extended to unfold the frame sections 3b and 3f, the latch hooks 83 catch the latch plates 81, thus briefly holding the rear portions of those frame sections in place as the front portions start to unfold. This action allows the fronts of the frame sections 3a, 3b and 3g, 3f to be unfolded first, thus allowing a smooth reversal of the folding process.

IV. Hitch Connection

Referring again to FIGS. 1 and 2, two different versions of a V shaped hitch are illustrated, generally indicated, respectively, at 91a in FIG. 1 and 91b in FIG. 2. The hitch 91a includes a pair of hitch bars 92a and 93a which extend beneath the fronts of respective center frame sections 3c and 3e. The hitch 91b also includes a pair of hitch bars 92b and 93b. Each of the hitch bars 92b and 93b includes a brace formed by a pair of triangular bars 94 attached via an upright bar 95. The hitch bars 92b and 93b also extend beneath the fronts of respective center frame sections 3c and 3e. In both of the hitch embodiments 91a and 91b, the hitch bars 92a, 93a and 92b, 93b, respectively, are pivotably attached to the respective center frame sections 3c and 3e via respective pivot mounts 101 which are positioned between the front and rear of those center frame sections. This allows the implement 1 to freely tilt forward and backward relative to the hitch 91a or 91b to better follow uneven terrain.

V. Seeder and Press Wheel Configuration

Referring now to FIGS. 1 and 9–13, the implement 1 is shown set up as a seeder in cooperation with the towed pneumatic seed cart 6. Seeds from the cart 6, such as, e.g. wheat or soybean seeds, are metered by the cart 6 by ground speed in a known fashion and supplied to various seeding sweeps 103 provided on the implement 1 via the respective pneumatic seed tubes 7. FIG. 9 illustrates a portion of the implement 1 including one of the frame sections 3*a*–3*g* with a plurality of seeding sweeps 103 mounted thereon. Also attached to the implement 1 are a plurality of trailing press wheel pairs 105 attached to pivot mounted frames 111. The press wheel pairs 105 and the seeding sweeps 103 are designed to allow quick conversion of the implement 1 from 10 inch row spacing to 20 inch row spacing in the following manner.

Each press wheel pair 105 includes identical left and right wheels 112 rotatably attached to respective L shaped support shafts 113. Each shaft 113 is attached to a respective collar 114 which is sized to fit over a press wheel pair support shaft 115. Each collar 114 is welded to a movable adjustment plate 121 while a front stationary adjustment plate 122 is welded to the support shaft 115 and a rear stationary adjustment plate 123 is pinned in place on the support shaft 115 via a retention pin 124 extending through an attached collar 125. Each of the stationary plates 122 and 123 include a respective dowel pin 131 attached thereto and extending inward toward a respective one of the movable plates 121. Each of the movable plates 121 includes a pair of pin receiving bores 132 and 133 which are spaced to control camber.

In order to adjust the spacing of the press wheels 112, the dowel pins 131 are forced out of the pin receiving bores 132 or 133 and the collars 114 are rotated about the shaft 115 until the other pin receiving bore 132 or 133 is aligned with the pin 131, such that the pin 131 now enters that other bore. In this manner, the press wheels 112 are moved from the position of FIG. 11 where they converge to cover a single seed row 134 to the position of FIG. 13 where the press wheels 112 are spaced apart to cover a respective pair of spaced seed rows 135.

In a complementary fashion, the seeding sweeps 103 are changeable between single and double row configurations, as follows. Each seeding sweep 103 includes a sweep 141 which creates a furrow 142 for the application of the seed row or rows 134 or 135, respectively. Attached to the rear of the sweep 141 is a seed tube support housing 143, which can be made of high impact plastic or steel, for example. The housing 143 includes an upper seed tube 144 which terminates just above a channel 145 which interchangeably accommodates either a single row seed tube extension 150 or a double row seed tube extension 151. When the double row seed tube extension 151 is used, due to pneumatic action, seeds 146 coming down from the seed tubes 104 (FIG. 9) and 144 divide approximately evenly left and right to pass through left and right outlets 152 and 153, respectively. The single row seeder configuration of FIG. 10 is thus complementary to the press wheel pair configuration of FIG. 11 while the double row seeder configuration of FIG. 12 is complementary to the press wheel pair configuration of FIG. 13, and the implement 1 is readily and conveniently changeable from one configuration to the other, as explained above.

VI. Seeding Sweep With Integral Fertilizer Applicator

FIG. 14 illustrates an alternative embodiment of seeding sweep, generally indicated at 161. The alternative seeding sweep 161 includes an attachment plate 162 with an opening 163 formed therein. The opening 163 connects with a hollow shank 164. A plurality of cylindrical tubes 165–167 and a square support bar 168 extend downward from the interior of the hollow shank 164. The tube 165 connects with a V shaped channel 173, one side of which is shown in dotted lines in FIG. 14, which has openings 174 and 175 on either side for selectively dropping anhydrous fertilizer on either side of one or two planted rows, respectively. The tube 167 connects with a channel 181 which extends outward and backward at an angle in the sweep 171 and which also has openings 182 and 183 for selectively dropping liquid fertilizer alongside a single or double planted rows, respectively. The tube 166 is attached to a similar channel (not shown) to drop liquid fertilizer on the other side of the sweep 171. Three flexible hoses 184 can be inserted into the hollow shank 164 via the opening 163 to supply liquid fertilizer or the like to the tubes 166 and 167 and/or anhydrous fertilizer or the like to the tube 165. In this fashion, up to three different fertilizers, pesticides or other chemicals can be introduced into the seed furrow 142 alongside the seeds, thus potentially eliminating the need for multiple passes over the field for seeding and fertilizer. Instead of connecting the hoses 184 internally within the shank 164, the tubes 165, 166 and 167 could be extended upward such that they extend out of the top of the opening 163 to allow the hoses 184 to be attached to the tubes via barb end connectors or the like.

Variations in construction detail will occur to those of ordinary skill in the art. For example, the latch plate 81 and hook 83 could be configured in a number of different ways and other types of limit stop devices could be substituted for the specific scissor limit stops 43. Shapes and relative sizes of the components of the implement 1 could be altered without affecting the overall viability of the invention, and, as mentioned previously, less than, or more than seven frame sections could be utilized. It is thus to be understood that while certain forms of the present invention have been illustrated and described herein, it is not to be limited to the specific forms or arrangement of parts described and shown.

What is claimed is:

1. An agricultural implement comprising:
   a. first and second independent frame sections positioned adjacent to each other, at least one of said frame sections comprising a folding frame section adapted to be raised for transport and lowered for operation, each said independent frame section being arranged to support a plurality of ground working tools;
   b. a flexible link connector connected to and extending between said frame sections, said flexible link connector allowing the attached frame sections to twist up or down with respect to each other; and
   c. a scissor limit stop connected to said flexible link connector, said scissor limit stop serving to limit the relative up and down movement between the frame sections when said folding frame section is in the lowered, operating position thereof.

2. An agricultural implement as in claim 1, wherein each said frame section includes a respective front frame member, said flexible link connector comprising:
   a. a bar with first and second ends, said bar first end being pivotably attached a center point of a front frame member of one frame section, and said bar second end being pivotably attached proximate a front corner of the front frame member of the adjacent frame section.

3. An agricultural implement as in claim 2, wherein each said frame section includes a respective rear frame member, said implement further comprising:
   a. a rear hinge joint, said hinge joint being attached to and extending between said frame sections proximate the corresponding rear frame members, each said hinge joint allowing the rear portions of the attached frame sections to pivot relative to the adjacent frame section.

4. An agricultural implement as in claim 3, wherein said rear hinge joint comprises a ball joint.

5. An agricultural implement as in claim 3, wherein one of said frame sections is a center frame section, said implement further comprising:
 a. a folding piston & cylinder unit, with a first end attached to said center frame section and a second end attached to a respective said folding frame section, said folding piston & cylinder unit folding the folding frame section relative to the center frame section when retracted and unfolding the folding frame section relative to the center frame section when extended.

6. An agricultural implement as in claim 5, wherein said second end of said flexible link connector is positioned in alignment with the rear hinge joint.

7. An agricultural implement as in claim 6, wherein, as said folding piston & cylinder unit is retracted, the scissor limit stop attached to the flexible link connector extending between the folding frame section and the center frame section acts to limit relative shifting between the folding frame section and the center frame section and to shift the pivot point of the flexible link connector to the bar second end such that it is in line with the rear hinge joint.

8. An agricultural implement as in claim 3, wherein one of said frame sections is a center frame section, said folding frame section is a middle folding frame section, said implement further comprising:
 a. an outermost folding frame section positioned adjacent to the middle folding frame section;
 b. a middle folding piston & cylinder unit, with a first end attached to said center frame section and a second end attached to said middle folding frame section, said middle folding piston & cylinder unit folding the middle folding frame section relative to the center frame section when retracted and unfolding the middle folding frame section relative to the center frame section when extended; and
 c. an outer folding piston & cylinder unit, with a first end attached to said middle folding frame section and a second end attached to said outermost folding frame section, said outer folding piston & cylinder unit folding the outermost folding frame section relative to the middle folding frame section when retracted and unfolding the outermost folding frame section relative to the middle folding frame section when extended.

9. An agricultural implement as in claim 8, and further comprising:
 a. a hitch with a pair of hitch bars which converge at respective hitch bar front ends where the hitch is removably attachable to a prime mover and which diverge at respective bar rear ends, with each said hitch bar rear end being pivotably attached to said center frame section approximately equidistant between the front and back frame members.

10. An agricultural implement as in claim 8, wherein each of said second ends of said flexible link connectors is positioned in alignment with the respective rear hinge joint connecting the same two frame sections, and as said middle and outer folding piston & cylinder units are retracted, the scissor limit stop attached to the flexible link connector extending between each folding frame section and the adjacent frame section acts to limit relative shifting between the folding frame section and the adjacent frame section and to shift the pivot point of the respective flexible link connector to the bar second end such that it is in line with the respective rear hinge joint between that folding frame section and the adjacent frame section.

11. An agricultural implement as in claim 10, and further comprising:
 a. a latch member attached to said center section proximate the rear frame member;
 b. a mating latch member attached to said middle folding frame section attached proximate the rear frame member, said mating latch member engaging said latch member when the middle folding piston & cylinder unit is fully retracted and staying engaged during initial stages of extension of the middle folding piston & cylinder unit to allow a front portion of the middle folding frame section to initially pivot outward.

12. An agricultural implement as in claim 2, wherein said scissor limit stop comprises:
 a. an ear depending downward from the respective flexible link connector bar;
 b. a pair of elongate plates positioned on opposing sides of said flexible link connector bar and pivotably attached, proximate a lower end of each plate to the depending ear, said pair of plates also being linked to each other proximate a top end thereof; and
 c. a pivot arm with a first end pivotably attached to said pair of plates between said lower and top end thereof and a second, opposite end of the pivot arm pivotably attached to an upright frame support which is, in turn, rigidly attached to the respective frame section proximate the front thereof.

13. An agricultural implement as in claim 1 wherein said frame sections are supported by ground engaging wheels.

14. An agricultural implement comprising:
 a. a number of independent frame sections each arranged to support a plurality of ground working tools via respective front and rear ground engaging wheels, said frame sections being arrayed side by side with each of said frame sections including front and rear frame members;
 b. a plurality of flexible link connectors, each said flexible link connector being pivotably attached to and extending between each respective adjacent pair of said frame sections proximate the front frame members thereof, each said flexible link connector allowing the front frame members of the attached frame sections to twist up or down with respect to the adjacent frame section;
 c. a plurality of scissor limit stops with each said scissor limit stop being attached to a respective one of said flexible link connectors, each said scissor limit stop serving to limit the relative up or down movement between the frame sections attached to its corresponding flexible link connector; and
 d. a plurality of rear ball joints, each said ball joint being attached to and extending between a respective adjacent pair of said frame sections proximate the corresponding rear frame members, each said ball joint allowing the rear frame members of the attached frame sections to pivot relative to the adjacent frame section.

15. An agricultural implement as in claim 14, each said flexible link connector comprising:
 a. a bar with first and second ends, said bar first end being pivotably attached to a center point of a front frame member of one frame section, and said bar second end being pivotably attached proximate a front corner of the front frame member of the adjacent frame section.

16. An agricultural implement as in claim 15, wherein each of said second ends of said flexible link connector bars is positioned in alignment with the respective rear ball joint connecting the same two frame sections.

17. An agricultural implement as in claim 16, wherein there are seven of said frame sections with three of said frame sections being center frame sections, two of said sections being middle folding frame sections and two of said frame sections being outermost folding frame sections, said implement further comprising:
 a. a pair of middle folding piston & cylinder units, each with a first end attached to a respective one of said center frame sections and a second end attached to a respective one of said middle folding frame sections, each said middle folding piston & cylinder units folding the attached folding frame section relative to the adjacent center frame section when retracted and unfolding the attached folding frame section relative to the adjacent center frame section when extended; and
 b. a pair of outer folding piston & cylinder units, each with a first end attached to a respective one of said middle folding frame sections and a second end attached to a respective one of said outermost folding frame sections, each said outer folding piston & cylinder units folding the attached outermost folding frame section relative to the adjacent middle folding frame section when retracted and unfolding the attached outermost folding frame section relative to the adjacent middle folding frame section when extended.

18. An agricultural implement as in claim 17, and further comprising:
 a. a hitch with a pair of hitch bars which converge at respective hitch bar front ends where the hitch is removably attachable to a prime mover and which diverge at respective bar rear ends, with each said hitch bar rear end being pivotally attached to a respective one of said center frame sections approximately equidistant between the front and back frame members.

19. An agricultural implement as in claim 17, and further comprising:
 a. a latch member attached to each center section proximate the rear frame member; and
 b. a mating latch member attached to each middle folding frame section attached proximate the rear frame member, said mating latch member engaging said latch member when the respective middle folding piston & cylinder unit is fully retracted and staying engaged during initial stages of extension of the respective middle folding piston & cylinder unit to allow a front portion of the middle folding frame section to initially pivot outward.

20. An agricultural implement as in claim 14, wherein each of said scissor limit stops comprises:
 a. an ear depending downward from the respective flexible link connector bar;
 b. a pair of elongate plates positioned on opposing sides of said flexible link connector bar and pivotably attached, proximate a lower end of each plate to the depending ear, said pair of plates also being linked to each other proximate a top end thereof; and
 c. a pivot arm with a first end pivotably attached to said pair of plates between said lower and top end thereof and a second, opposite end of the pivot arm pivotably attached to an upright frame support which is, in turn, rigidly attached to the respective frame section proximate the front thereof.

21. An agricultural implement as in claim 17, wherein, as each of said middle and outer folding piston & cylinder units are retracted, the scissor limit stop attached to the flexible link connector extending between each folding frame section and the adjacent frame section acts to limit relative shifting between the folding frame section and the adjacent frame section and to shift the pivot point of the respective flexible link connector to the bar second end such that it is in line with the respective rear ball joint between that folding frame section and the adjacent frame section.

* * * * *